(12) United States Patent
Fuligni

(10) Patent No.: US 11,785,935 B2
(45) Date of Patent: Oct. 17, 2023

(54) ELECTROMECHANICAL TRAP FOR SMALL ANIMALS

(71) Applicant: Adolfo Gabriel Fuligni, Chubut (AR)

(72) Inventor: Adolfo Gabriel Fuligni, Chubut (AR)

( * ) Notice: Subject to any disclaimer, the term of this patent is extended or adjusted under 35 U.S.C. 154(b) by 0 days.

(21) Appl. No.: 17/498,144

(22) Filed: Oct. 11, 2021

(65) Prior Publication Data
US 2022/0232817 A1 Jul. 28, 2022

(51) Int. Cl.
*A01M 23/06* (2006.01)
*A01M 23/20* (2006.01)
*A01M 31/00* (2006.01)

(52) U.S. Cl.
CPC ............ *A01M 23/06* (2013.01); *A01M 23/20* (2013.01); *A01M 31/002* (2013.01)

(58) Field of Classification Search
CPC .............................. A01M 23/06; A01M 23/20
See application file for complete search history.

(56) References Cited

U.S. PATENT DOCUMENTS

| | | | | | |
|---|---|---|---|---|---|
| 1,668,367 | A | * | 5/1928 | Hentschel | A01M 23/06 43/70 |
| 2006/0032110 | A1 | | 2/2006 | Yang | |

* cited by examiner

*Primary Examiner* — Jessica B Wong
(74) *Attorney, Agent, or Firm* — Defillo & Associates, Inc.; Evelyn A. Defillo

(57) ABSTRACT

An electromechanical trap for small animals having a container attached to a module whose upper side is a swing frame which includes a solar panel. The module includes a tunnel with an open end and an access to let the animals to be caught enter and the floor includes a first fixed part, a second part, which has a missing section which coincides with the cutting on the module floor and a third fixed part where there is an appropriate vessel for the bait. First part and missing section of the second part have a tilting lamina as of at least an axis connected to the side ends of the tunnel. The tunnel has several sensors which generate a beam whose interruption sends a signal captured by the microprocessor enabling a single exit, energizing the coil which, during a programmed time equals the polarity of the permanent magnet freeing the lamina whose end, as the result of the animal weight, goes violently down tilting over the axis and lifting the opposite end in an equal or higher angle of 45 degrees.

8 Claims, 4 Drawing Sheets

ELECTROMECHANICAL TRAP FOR SMALL ANIMALS

FIELD OF THE INVENTION

This invention includes an electromechanical trap for small animals following the detailed information stated herein below together with the drawings shown for a better understanding of the development, not limiting the invention in itself to such description and drawings but presented as a help for its study, understanding and application.

PREVIOUS ART

Many devices are known to have been made to catch living creatures. In some cases, the catching procedures were created thousands of years ago. The catching techniques and the materials used in the traps have evolved but the need for these traps has increased. In many cases these small animals are used for food or for the exploitation of sub-products which are taken from such animals, for example: their skin, fur, oils, bones and many other products.

They are also captured for breeding in captivity, to be kept as pets or to get rid of them when they are considered a pest or a sanitary problem. It is a serious problem to be solved in areas where the increase in the number of these animals is related to the transmission of these pests to human beings.

Traps could be divided into three different groups:— Manual traps which are the shape of a box and fall over the animal by pulling a stick or throwing a net over the prey.— Mechanical traps which have some bait connected to a spring-loaded system which hits and keeps the animal; or the mechanism that closes the doors of a tunnel when the animal touches them; or the ones in the shape of a jaw which are shut catching the leg of the animal which steps onto the trigger.—Electronic or electromechanical traps.

Within the existing records, we have proceeded to the study of the document ES 2660501 which includes an alarm proceeding and system and remote verification for the arts of capture of animals which include at least one shooting or activation sensor, a sending device of a wireless signal, an alert control system and a transparent interface for the user (WEB+mobile). The alarm device is connected through a wireless communication technology which communicates the party concerned in a direct way or through a server with the alert control system. If there isn't wireless connection, the signal is sent to a storage device and/or an alert control system, located in a place where the coverage is available via RF to be sent to the party concerned or the server later. A clock is provided that gives periodic automatic alerts in real time to inform about its condition and a camera which allows visualization in a remote way. It also has a button to know about performance condition and to run basic functions.

The Spanish utility model number U201730044 is also studied which refers to a prey capture device, which contains a flexible laminar body attached to some deployment projectiles which include projectile cannon launchers which are placed on a common support, being the device characterized because at least one of the cannon launchers is placed on the common support with orientation means.

The flexible laminar body includes a net and independent orientation means arrayed between each cannon and the common support; and where such orientation means have horizontal and vertical orientation means, having such means a horizontal slider and a vertical slider attached to the first one. The orientation means include a spinning system or extreme joints inside each cannon and/or some distancing sliders in relation to the pivot point and adjustable with immobilizing screws. Also, it includes clamping brackets and the common support includes some grab handles; and, to achieve the simultaneous performance of all the discharging valves you can choose either electric or pneumatic and if you want to activate the cannons you can choose among pneumatic, mechanic, electric or pyrotechnic.

Such invention includes a recharging fitting of a pressure gas boiler connected to supply and a non-return valve which avoids backflows during the charging. It also includes a pressure-regulating valve to control de pressure of the charge of the boiler or the discharge during the shooting. The cannons pneumatically activated includes a pushing internal hosting where the projectiles are placed. It contains o'rings, toppers, buffers for such stoppers and depressurizers.

The document ES-1154634 U is also known which includes a spring-loaded trap includes a container which holds a supportive spring at one end of the container and a lid at the other end. The spring has means of light and this is phosphorescent, fluorescent, luminescent, incandescent or thermo luminescent; and pheromones are used in order to attract animals.

There are traps which include a container of electronic circuit which has a conduit with an open end and an opposite end where the bait is placed. When the animal gets to the end where the bait is, it is standing on two parts of floor which are connected to the corresponding poles of an electric circuit which triggers an electrical shock that electrocutes the animal.

OBJECT

An object of the proposed invention is to have a trap which includes a container with an appropriate measure to keep at least one of the animals you are trying to catch even when, in a preferred way of the embodiment, the container has enough room for many of them.

Another object of the proposed invention is to have a programming control board that is connected to a microprocessor, to at least one sensor, to a permanent magnet, to a tilting lamina, to a coil and to a counter.

Another object of the proposed invention includes a module which has a tilting lamina held in a fixed position by a permanent magnet and freed by the information sent to the microprocessor from at least one sensor.

Another object of the proposed invention is to include an entrance tunnel which includes an entrance end, a middle section including the tilting lamina and a rear end where there is a vessel with bait.

Another object of the proposed invention is to have a solar screen, a charge regulator, a battery and an on/off switch.

Another object of the proposed invention is to include a power input and a transformer.

Another object of the proposed invention is to have safety device which can block the performance of the tilting lamina.

Another object of the proposed invention is to include at least one sensor chosen among motion, temperature, infrared, capacitive, inductive, optical, magnetic, microwave, mechanical and contact sensors.

It is another object of the invention to include from one to four different entrances to the tunnel.

It is also another object of the invention to have a counter which registers the number of falls of the tilting lamina and a way to take the counter to zero again.

Another object of the proposed invention is to have a way of catching and keeping small animals without injuring them, so they can be taken out of the container and dispose of them as appropriate.

SUMMARY OF THE INVENTION

Basically, the proposed invention, which is an electromechanical trap for small animals, includes a container and a module attached to it. The module includes the necessary elements for the supply of the components, an entrance for the animals to be captured and a tunnel with a vessel with bait, different types of sensors and a tilting lamina

BRIEF DESCRIPTION OF THE FIGURES

Several schematic drawings are included to allow a better understanding of this invention.

Such figures have been schematized in different scales.

Figure 1:
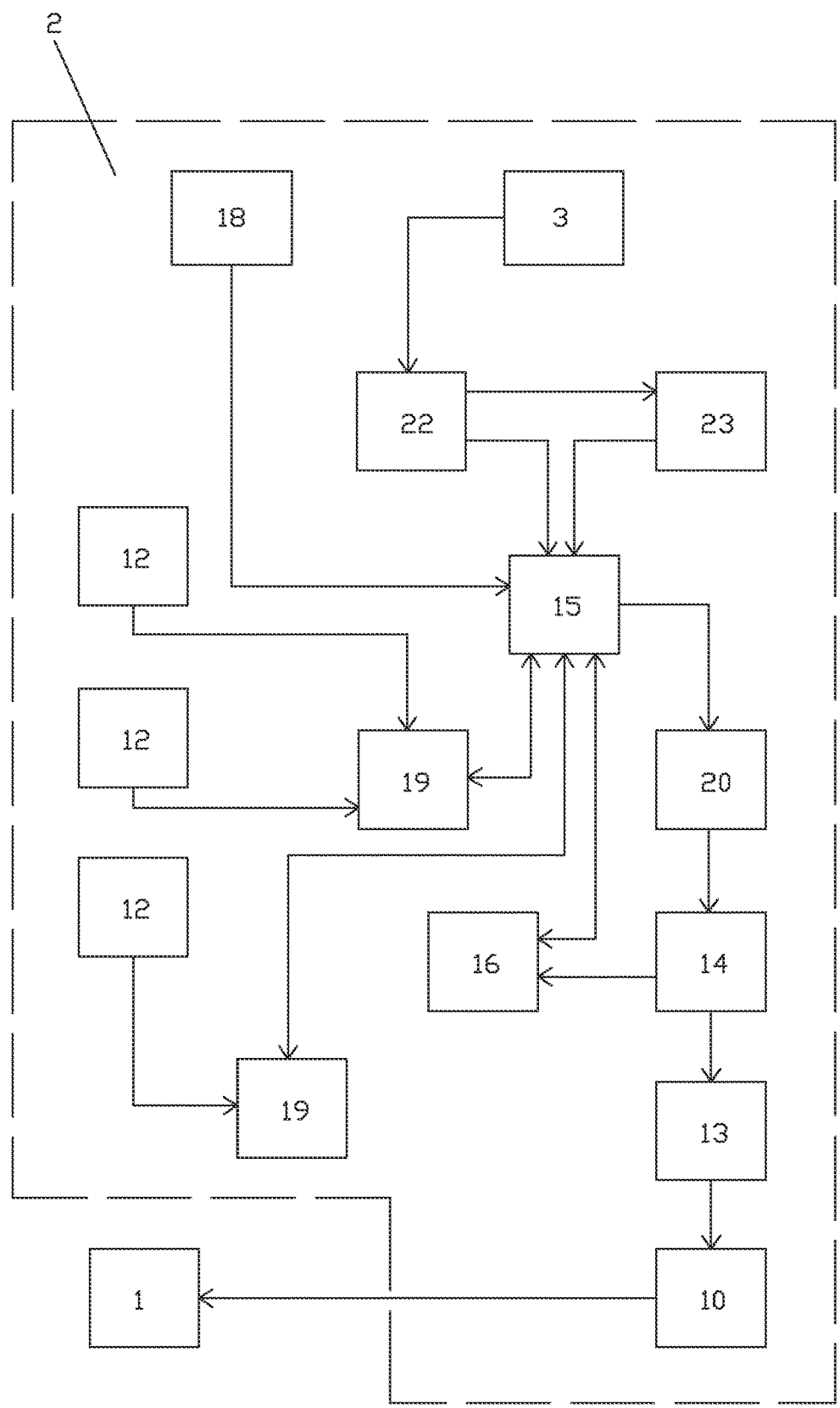
FIG. 1 schematizes a block diagram which represents the relationship between the different components that are part of the invention.
Figure 2:
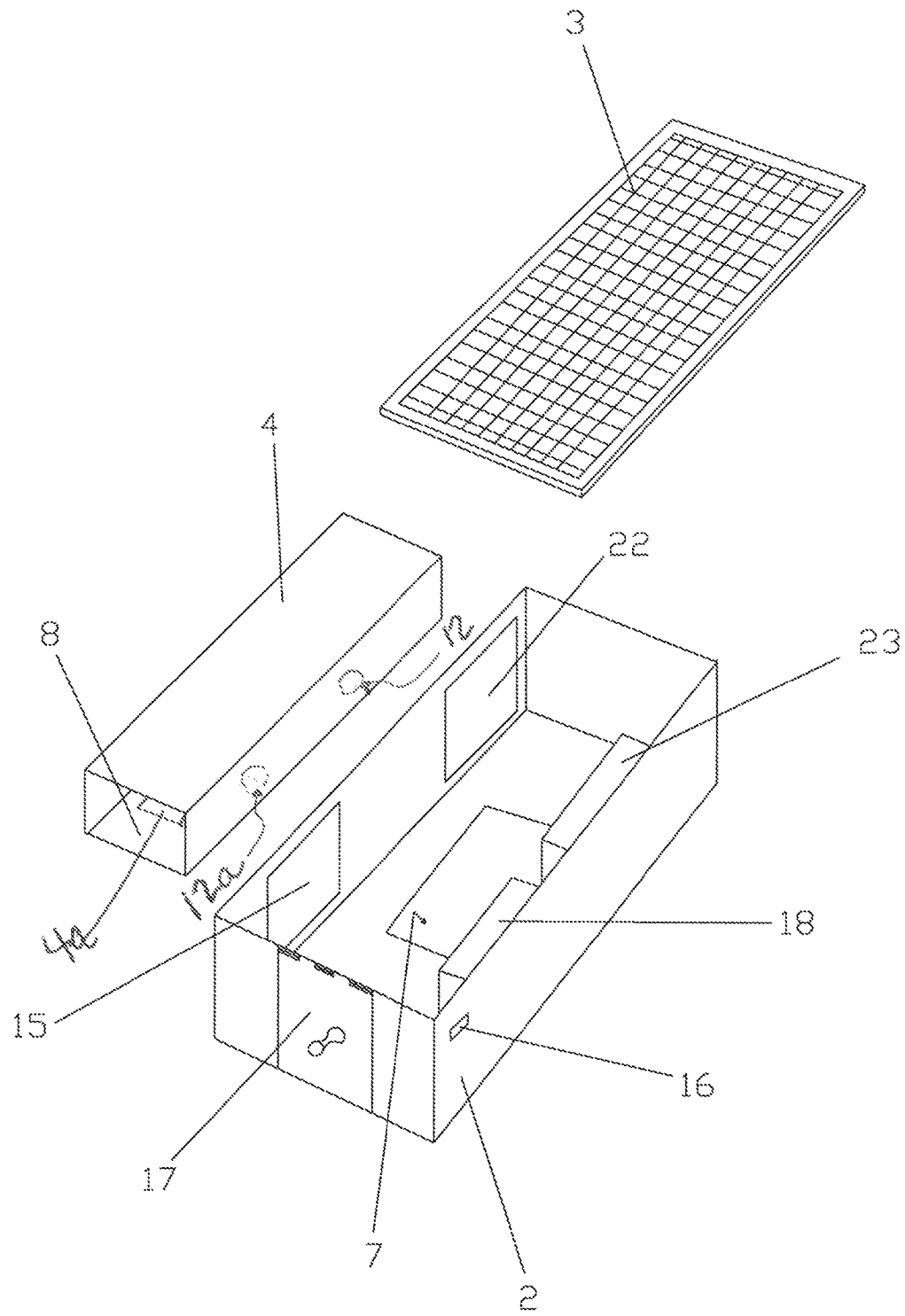
FIG. 2 schematizes the different pieces that represent the module components.
Figure 3:
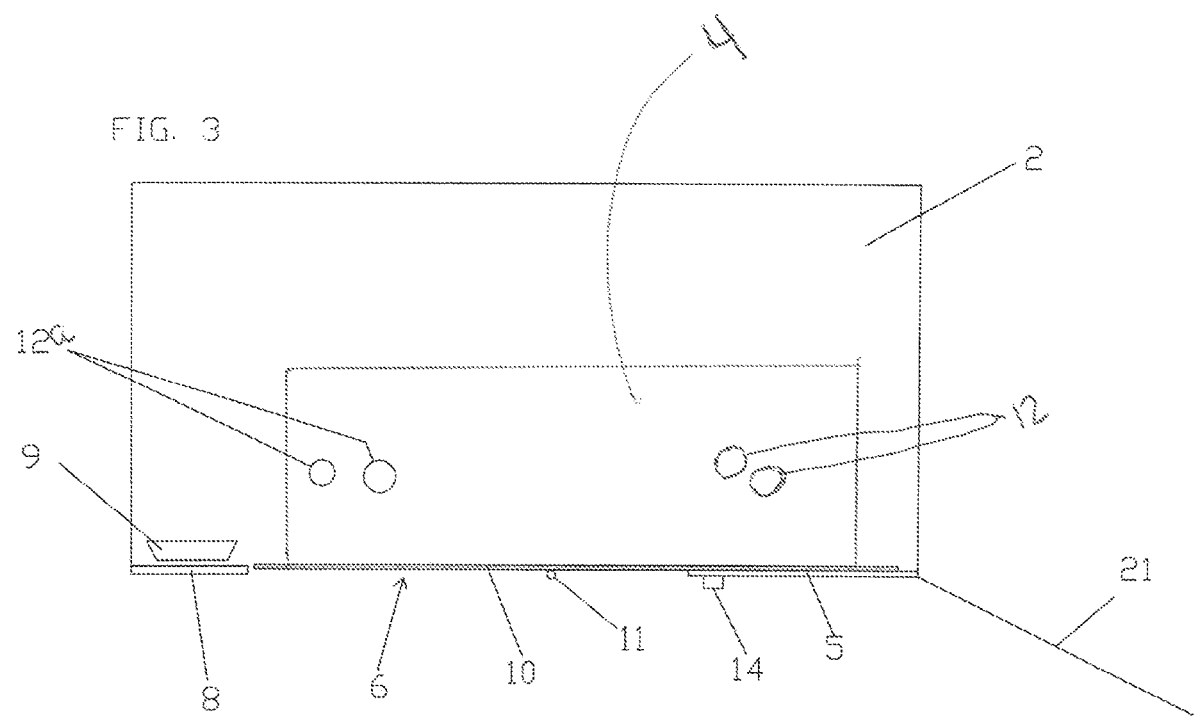
FIG. 3 schematizes a sectional view of the tunnel.
Figure 4:
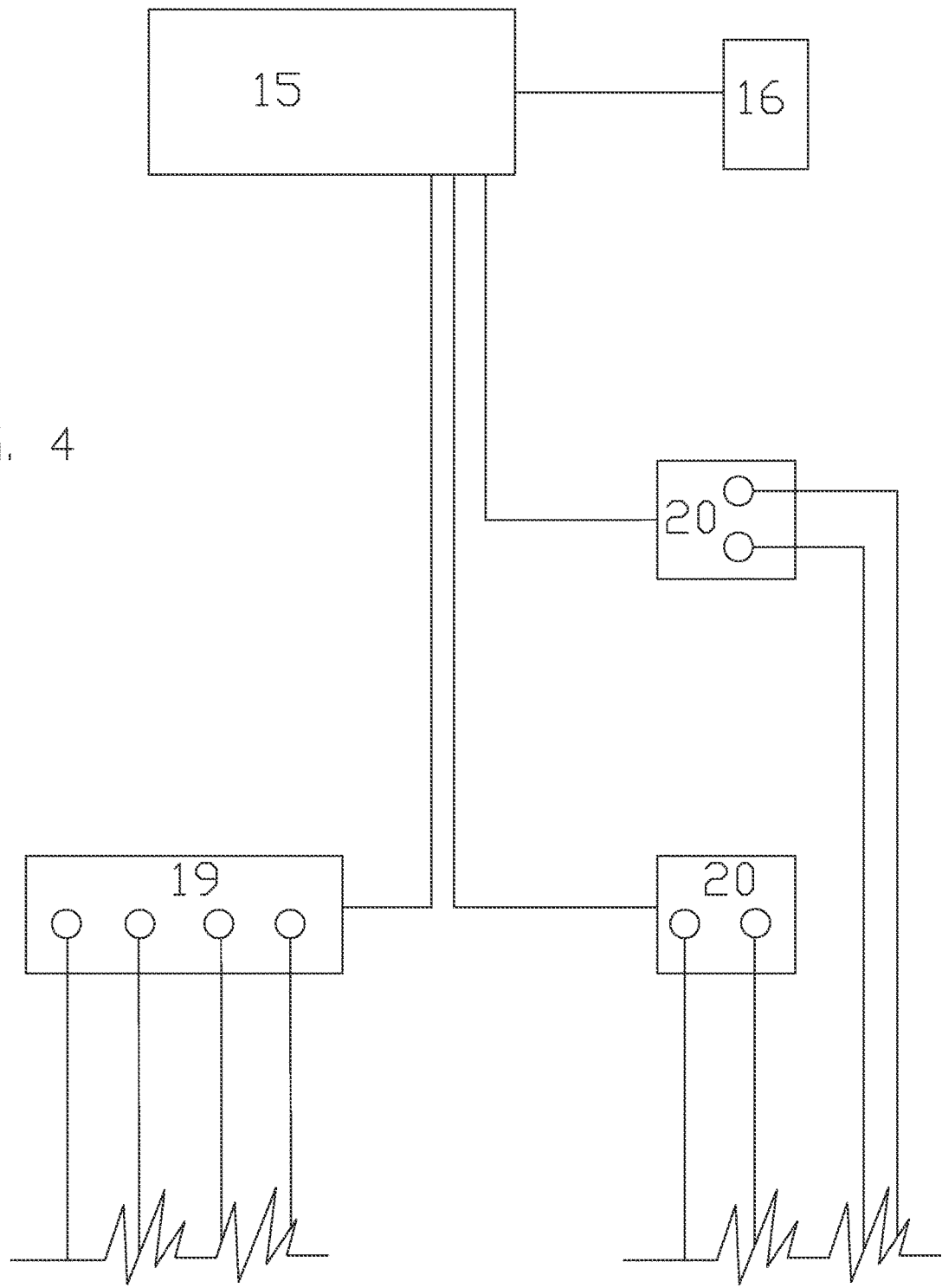

Finally, FIG. 4 schematizes a plant view of a card where the microprocessor, the visual display and single and double exits are represented.

REFERENCES

In the described figures, the same characters represent equal or complementary parts.

Number -1- shows the container; number -2- shows a module; number -3- shows a solar panel; number -4- shows a tunnel; number -5- shows the first part; number -6- shows the second part; number -7- shows an opening; number -8- shows a third part; number -9- shows a vessel; number -10- shows a tilting lamina; number -11- shows an axis; number -12- shows a sensor; number -13- shows a permanent magnet; number -14- shows a coil or inductor; number -15- shows a microprocessor; number -16- shows a visual display; number -17- shows a lid; number -18- shows a transformer, number -19- shows a double exit; number -20- shows a single exit; number -21- shows an access ramp; number -22- shows a regulator plate; number -23- shows a gel battery.

Functioning

In order to obtain an electromechanical trap for small animals developed to catch and keep animals, an appropriate device is provided to keep a certain number of animals that are needed to be caught.

The size of such device is directly related not only to the number of animals but also to the kind of animal to be caught.

The invention that is revealed includes -1- a container suitable to keep the captured animals and a module -2- which can be fixed on top of it.

The upper side of such module (2) includes a swing frame where a solar panel -3- is attached and which collects enough energy so that all the components can be kept active.

Within the module and under the solar panel (3) there is a tunnel -4- whose floor represents a first fixed part -5- and it is the place where the animal to be capture enters into the trap.

A second part -6- of the floor represents a cut section 7 which coincides with the opening -4a- of the floor of the tunnel (4) which covers enough surface where the animal fits and can fall into the container (1) while it walks along the way between the first part (5) and the third part -8- which is also fixed and where there is a vessel -9- suitable to keep the bait to tempt the animal intended to be caught.

On the first part (5) and also on the missing part of the second part there is (6) a tilting lamina -10- from an axis -11- connected to the side ends of the tunnel (4).

In the tunnel (4) and along all the way that the animal has to follow until it gets to the vessel (9) with the bait, there are several sensors -12- which are sensors of motion, temperature, infrared, capacitive, inductive, optical, magnetic, microwave, mechanical and contact.

In an ideal way of embodiment, different types of sensors (12) are placed in the tunnel (4) in order to cover all the possibilities to record the entry and movements of the animal.

As the animal moves towards the vessel (9) with the bait, its weight moves towards such end of the tilting lamina (10) which is kept in its place thanks to a permanent magnet -13- powered by a coil -14- which is placed in the lower side of the first part (5).

The information collected by the sensors (12) is sent to a microprocessor -15- which changes the magnetic field of the coil (14) freeing the tilting lamina (10) that, due to the animal weight, tilts on the axis (11) lowering the nearest end to the vessel (9) where the animal is, in a violent way.

As a part of such tilting lamina (10) is on the first part (5), when tilting on the axis (11) it goes up, forming an angle which makes it impossible for the animal to go backwards or jump onto a horizontal surface.

Besides, the flat material of the tilting lamina (10) plus the fact that tilting lamina strikes a blow when it reaches its top encourage the fall of the animal into the container (1) and make it impossible for it to jump or go back.

The microprocessor (15) can be programmed so the container (1) can receive a specific number of animals. In a visible part of the module (2) a visual display -16- or visualizer is set which records the number of times the polarity of the magnetic field of the coil (14) is changed.

The induction of the coil (14) activates the permanent magnet (13) which holds the tilting lamina (10) in a resting position, that is to say, covering the missing part of the floor of the second part (6). The sensor information (12) decoded by the micro processor (15) determines the change of polarity of the magnetic field generated by the inductor (14).

In this case, the power that holds the tilting lamina (10) in its horizontal position disappears, so the weight of the animal to be caught makes it tilt and the animal goes through the opening (7) and falls into the container (1).

The number of animals which can be caught depends on the size of the container (1) but also in the way we want to connect with the other living creatures. So, the user has to keep in mind the suffering of the captured animals avoiding overcrowding.

The tunnel (4) is open at one of its ends so that the animal to be caught can smell and see the bait in the vessel (9) and is tempted to get in.

The opposite end faces one of the small sides of the module (2) which contains a hinged lid -17- which has a knob to open it letting us see the third part (8) of the tunnel (4) and allowing the cleaning and replenish of the bait.

A transformer -18- is provided in the module (2) which is connected to the power network and to the microprocessor (15) where the program that controls several components of this invention is stored.

As we have said before, the parameters of such program may be varied or changed entering the microprocessor (15) through a suitable means, either in the same site or from a remote place.

The invention also includes a visual display (16) that can represent at least one digit in coincidence with the number of animals that have entered into the container (1).

There is a double exit -19- connected to the sensors (12) which are distributed along the tunnel (4) and at least one single exit -20- where the coil (14) is energized from to change the polarity of the magnetic field.

When the beam among the second set of sensors (12a) is interrupted, the single exit (20) is opened by the microprocessor (15) energizing the coil (14) and changing the polarity of the electromagnetic field.

When energizing the inductor (14), current is passed through the core which takes the same polarity as the permanent magnet (13) repelling it, and as this is mounted in the tilting lamina (10) and so such tilting lamina is not held by such permanent magnet (13) the animal weight causes the tilting, slipping and fall of such animal.

Once the programmed time is due, the microprocessor (15) cuts the energy supply to the coil (14) so the core is discharged and taking into account that the core is made of non-magnetic iron, the permanent magnet (13) is attracted again and therefore it tilts in the opposite direction taking the tilting lamina (10) to a horizontal position leaving the trap ready to be used again.

When an animal is attracted by the bait, it climbs up the module (2) using an access ramp -21- that ends at the entrance of the tunnel (4). Once the animal is there, it goes onto the tilting lamina (10) until it interrupts the beam includes sensors (12) facing each other.

The sensors (12) are adjusted according to the type of animal to be captured and as they are placed in the latter half of the tunnel (4), when the animal is touched by the beam, it has already passed the center of balance of the tilting lamina (10) so the signal sent and captured by the microprocessor (15) opens the single exit (20) energizing the coil (14) that repels the permanent magnet (13) freeing the tilting lamina (10) which tilts in a violent way to make the animal fall into the container (1).

The time interval during which the coil (14) is energized is calculated according to the kind of animal to be caught and is regulated with the program recorded in the microprocessor (15).

In an ideal way of embodiment, the inventor has calculated that the angular movement of the tilting lamina (10) should be between 45 and 50 angle degrees.

In the ideal way of embodiment described above, the energy caught by the solar panel (3) cells pass through a regulator plate -22- feeds the microprocessor (15) and is stored in a gel battery -23- and of 12 to 15 volts.

In this preferred way of embodiment that is revealed, the permanent magnet (13) is made of neodymium alloy.

In the preferred way of embodiment which is described, the tunnel (4), the lamina (10), the axis (11) and the access ramp are made of metal.

In the preferred way which is described, the program blocks the change of polarity if a certain number of captured animals is exceeded. Similarly, the microprocessor (15) blocks the polarity when there is a failure or a disconnection is recorded.

In an alternative embodiment and taking into account that the blows resulting from the constant changes of polarity make a high noise, all the perimeter of the tilting lamina (10) is covered with a damper element such as rubber or a similar material.

In this way, the different components of the invention have been described, and also the way they are related to each other, complementing this document with the summary of the invention expressed in the claims which are listed below.

Having described and determined the nature of the invention, its scope and the way it can be put into practice in its main idea, it is declared as an invention and of exclusive property the following:

The invention claimed is:

1. An electromechanical trap for small animals comprising:
    a container to accommodate and keep a captured animal;
    a module placed on top of the container, wherein the module has an upper side including a solar panel, side walls, a first end, a second end, and a floor;
    a tunnel located inside the module and below the solar panel, the tunnel includes an open end a floor having an opening,
    the floor of the module includes a first fixed part located on a first end of the module, a second part having a cut section which coincides with the opening of the floor of the tunnel, and a third fixed part located on a second end of the module and includes a vessel adapted to hold a bait;
    a tilting lamina is located on the first fixed part and the cut of the second part and includes a first end close to the third fixed part and a second end on the first fixed part, the tilting lamina is connected to side ends of the tunnel;
    a permanent magnet powered by a coil, the permanent magnet holds the tilting lamina;
    an access ramp located on the first end of the module;
    a first set of sensors are located inside of the tunnel on a first section, the first set of sensors record a presence of the captured animal and sends the information about the animal to a microprocessor;
    a second set of sensors located inside the tunnel on a second section, the second set of sensors generate a beam and when the beam is interrupted, the second set of sensors sends a signal to the microprocessor, then the microprocessor changes a magnetic field of the coil freeing the tilting lamina, then the first end of the titling lamina tilts down and the second end of the tilting lamina is lifted to an angle of at least of 45 degrees;
    once a programmed time is due, the microprocessor stops supplying energy and the permanent magnet is attracted again lifting the tilting lamina to a horizontal position;
    wherein the animal to be captured climbs through the access ramp until the animal reaches the tunnel.

2. The trap according to claim 1, wherein the first and the second set of sensors are selected from the group consisting of motion sensors, temperature sensors, infrared sensors, capacitive sensors, inductive sensors, optical sensors, magnetic, microwave, mechanical, and contact sensors.

3. The trap according to claim 1, wherein the module is energized from an electrical network, the solar panel, or a battery.

4. The trap according to claim 1, wherein the microprocessor includes a program that determines an entrance of the animals to the container according to a predetermined number, interprets a time for changing the magnetic field of the coil.

5. The trap according to claim 1, further including a hinged lid on the first end of the module and a knob.

6. The trap according to claim 1, wherein the opening of the floor of the module allows the animal to fall into the container.

7. The trap according to claim 1, wherein the titling lamina includes a damper element made of rubber, the damper element is lactated along a perimeter of the titling lamina.

8. The trap according to claim 1, wherein the tunnel, the titling lamina, and the access ramp are made of metal and the permanent magnet is made of neodymium alloy.

* * * * *